US010072470B2

(12) United States Patent
Henriksen et al.

(10) Patent No.: US 10,072,470 B2
(45) Date of Patent: Sep. 11, 2018

(54) FLOW SENSOR ASSEMBLY

(71) Applicant: CAMERON INTERNATIONAL CORPORATION, Houston, TX (US)

(72) Inventors: Kim André Henriksen, Kristiansand (NO); Kenneth Torjussen, Kristiansand (NO)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 15/291,692

(22) Filed: Oct. 12, 2016

(65) Prior Publication Data

US 2017/0101834 A1 Apr. 13, 2017

(30) Foreign Application Priority Data

Oct. 12, 2015 (NO) .................................. 20151376

(51) Int. Cl.
*G01F 1/20* (2006.01)
*E21B 21/08* (2006.01)
*G01P 5/00* (2006.01)

(52) U.S. Cl.
CPC .............. *E21B 21/08* (2013.01); *G01P 5/005* (2013.01)

(58) Field of Classification Search
USPC .............. 73/152.25, 861.49, 152.29, 861.58, 73/861.39
See application file for complete search history.

(56) References Cited

U.S. PATENT DOCUMENTS

| 4,228,530 | A |   | 10/1980 | Bergey |   |
|---|---|---|---|---|---|
| 5,024,105 | A | * | 6/1991 | Tentler | ...................... G01F 1/22 73/861.54 |
| 5,092,167 | A | * | 3/1992 | Finley | ................... E21B 47/042 367/908 |
| 5,285,812 | A | * | 2/1994 | Morales | ..................... F15C 1/14 137/386 |
| 5,595,163 | A | * | 1/1997 | Nogi | ................... F02D 41/0027 123/494 |
| 5,635,636 | A | * | 6/1997 | Alexander | .............. E21B 47/10 166/250.01 |
| 6,230,694 | B1 |   | 5/2001 | Cook et al. |   |
| 6,240,787 | B1 | * | 6/2001 | Alexander | .............. E21B 47/10 73/152.18 |

(Continued)

FOREIGN PATENT DOCUMENTS

| EP | 0278671 A1 | 8/1988 |
|---|---|---|
| EP | 0437872 A2 | 7/1991 |

(Continued)

OTHER PUBLICATIONS

International Search Report and Written Opinion for the equivalent International patent application PCT/US2016/056647 dated Jan. 25, 2017.

(Continued)

*Primary Examiner* — Jewel V Dowtin
(74) *Attorney, Agent, or Firm* — Helene Raybaud

(57) ABSTRACT

A flow sensor assembly including a housing configured to couple to a fluid line, wherein the housing includes an inlet for receiving a flow of a first fluid, and a sensor coupled to the housing and configured to measure a flow level of a second fluid passing through the fluid line.

20 Claims, 13 Drawing Sheets

(56) References Cited

U.S. PATENT DOCUMENTS

| | | | |
|---|---|---|---|
| 7,114,579 B2 * | 10/2006 | Hutchinson | E21B 44/00 |
| | | | 166/250.01 |
| 8,863,858 B2 | 10/2014 | Hannegan et al. | |
| 8,904,858 B2 * | 12/2014 | Pope | E21B 47/102 |
| | | | 166/250.01 |
| 2009/0032304 A1 | 2/2009 | Groh | |
| 2010/0070206 A1 | 3/2010 | Wang et al. | |

FOREIGN PATENT DOCUMENTS

| | | |
|---|---|---|
| EP | 2617939 A1 | 7/2013 |
| WO | 2004/077187 A1 | 9/2004 |
| WO | 2015/053784 A1 | 4/2015 |

OTHER PUBLICATIONS

Office Action dated Oct. 19, 2017 for Norwegian Patent Application No. 20151376 (3 pgs.).

International Preliminary Report on Patentability for the equivalent International patent application PCT/US2016/056647 dated Apr. 17, 2018.

* cited by examiner

FLOW SENSOR ASSEMBLY

CROSS-REFERENCE TO RELATED APPLICATIONS

This application claims benefit of Norwegian Patent Application Serial No. NO 20151376 filed in the Norwegian Patent Office on Oct. 12, 2015, and entitled "Flow Sensor Assembly," which is hereby incorporated herein by reference in its entirety.

STATEMENT REGARDING FEDERALLY SPONSORED RESEARCH OR DEVELOPMENT

Not applicable.

BACKGROUND

Hydrocarbon drilling systems utilize drilling fluid or mud for drilling a wellbore in a subterranean earthen formation. Specifically, in some applications drilling fluid is pumped through a passage in a drill string extending into the wellbore, and down to a drill bit connected to a lower end of the drill string. The drilling fluid is ejected from the drill string through ports in the drill bit where the drilling fluid is used to cool the drill bit and transport materials cut from the wellbore to the surface via an annulus disposed between an inner surface of the wellbore and an outer surface of the drill string. Upon reaching the surface, the drilling fluid is flowed through a mud return line and deposited in a mud tank for processing prior to being flowed back into the drill string. In some applications, accurately measuring the level of drilling fluid flow through the mud return line is important for monitoring the drilling fluid balance in the wellbore. Several different types of sensors are used for measuring the flow rate of drilling fluid through the mud return line, including paddle flowmeters featuring a mechanical paddle that rises and falls with the level of drilling fluid in the mud return line, and non-contact radar level sensors that transmit a radar pulse that is reflected off of a surface of the drilling fluid flowing in the mud return line to determine the amount of fluid flowing through the mud return line.

SUMMARY

An embodiment of a flow sensor assembly comprises a housing configured to couple to a fluid line, wherein the housing comprises an inlet for receiving a flow of a first fluid, and a sensor coupled to the housing and configured to measure a flow level of a second fluid passing through the fluid line. In an embodiment, the housing comprises an inner surface and the inlet of the housing is configured to direct the first fluid against the inner surface of the housing. In an embodiment, the housing comprises a nozzle in fluid communication with the inlet, and wherein the nozzle is configured to increase the velocity of the first fluid as it is emitted from the nozzle. In certain embodiments, the flow sensor assembly further comprises a pressure regulator coupled to the inlet of the housing for directing the flow of the first fluid into the housing at a selected pressure. In an embodiment, the pressure regulator is configured to supply the inlet of the housing with the flow of the first fluid pressurized to approximately 2 bar. In an embodiment, the flow sensor assembly further comprises a spacer coupled between the housing and the fluid line. In certain embodiments, the spacer comprises a chamber having a larger cross-sectional area than a cross-sectional area of a chamber of the housing. In certain embodiments, the spacer comprises an inlet for receiving the flow of the first fluid. In an embodiment, the inlet is configured to direct the first fluid against the inner surface of the housing to disperse condensation disposed on the inner surface of the housing.

An embodiment of a well system comprises a well string disposed in a wellbore extending into a subterranean formation, a fluid line extending from the wellbore, wherein the fluid line is configured to direct a flow of a wellbore fluid from the wellbore, and a flow sensor assembly coupled to the fluid line, the flow sensor assembly comprising a housing configured to couple to the fluid line, wherein the housing comprises an inlet configured to direct a pressurized fluid against an inner surface of the housing, and a sensor coupled to the housing and configured to measure a flow level of the wellbore fluid passing through the fluid line. In an embodiment, the housing of the flow sensor assembly comprises a nozzle in fluid communication with the inlet, and wherein the nozzle is configured to increase the velocity of the pressurized fluid as it is emitted from the nozzle. In an embodiment, the flow sensor assembly further comprises a pressure regulator coupled to the inlet of the housing for directing a fluid flow into the housing at a selected pressure. In certain embodiments, an antenna of the sensor is in the line of sight of the wellbore fluid. In certain embodiments, an antenna of the sensor is not in the line of sight of the wellbore fluid. In an embodiment, the inlet is configured to direct the pressurized fluid against a surface of the sensor. In an embodiment, the flow sensor assembly further comprises a spacer coupled between the housing and the fluid line.

An embodiment of a method of measuring a fluid flow rate comprises directing a fluid flow of a first fluid against an inner surface of the housing, and measuring a flow level of a second fluid flowing in a fluid line with a sensor coupled to a housing. In an embodiment, the method further comprises increasing the velocity of the fluid flow of the first fluid by flowing the first fluid through a nozzle disposed in the housing. In an embodiment, the method further comprises regulating the pressure of the first fluid with a pressure regulator. In certain embodiments, the method further comprises dispersing condensation disposed on the inner surface of the housing by directing the flow of the first fluid against the inner surface of the housing.

BRIEF DESCRIPTION OF THE DRAWINGS

For a detailed description of exemplary embodiments, reference will now be made to the accompanying drawings in which.

DETAILED DESCRIPTION

Figure 1:
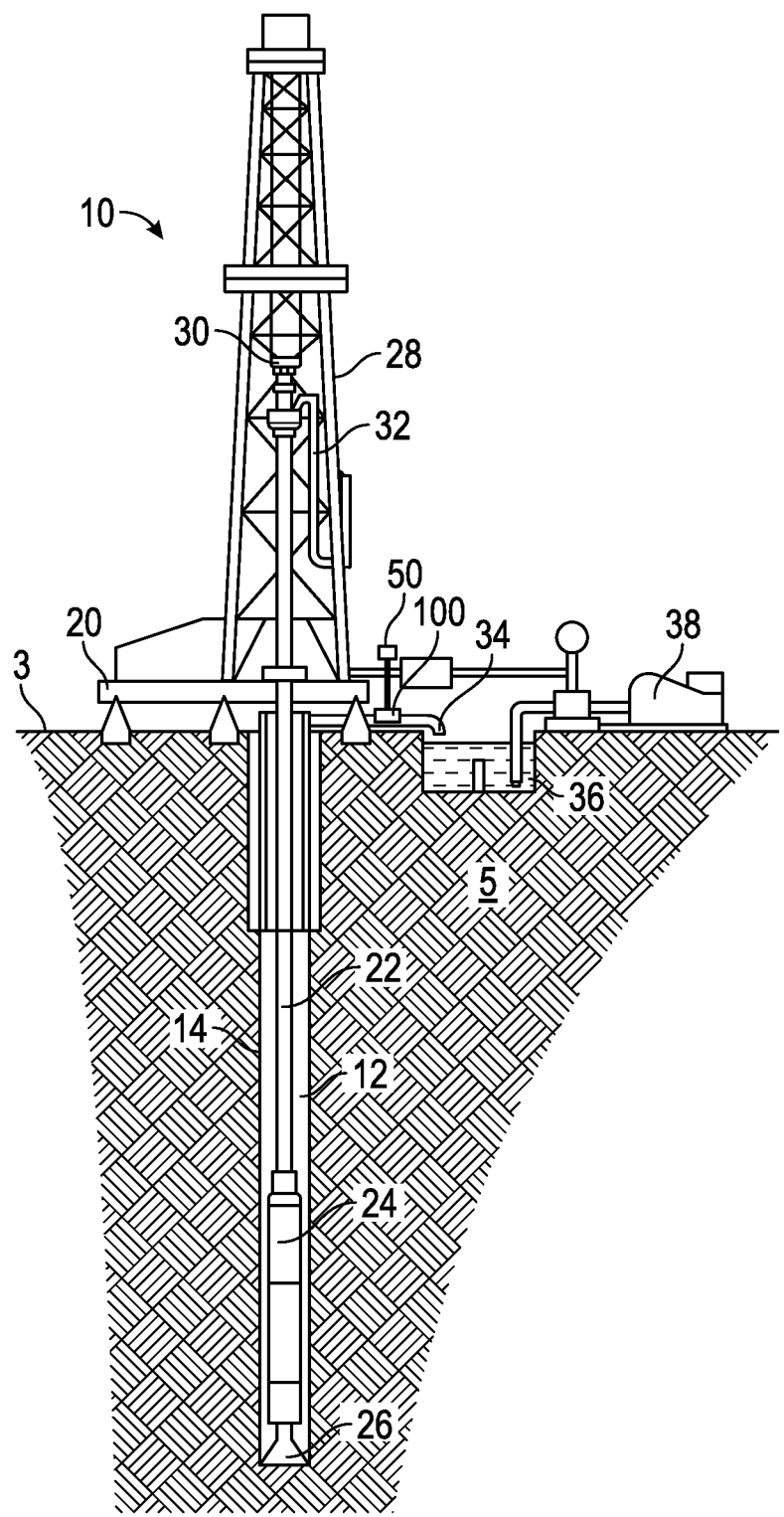
FIG. 1 is a schematic view of an embodiment of a well system in accordance with principles disclosed herein.

In the drawings and description that follow, like parts are typically marked throughout the specification and drawings with the same reference numerals. The drawing figures are not necessarily to scale. Certain features of the disclosed embodiments may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed below may be employed separately or in any suitable combination to produce desired results.

Unless otherwise specified, in the following discussion and in the claims, the terms "including" and "comprising" are used in an open-ended fashion, and thus should be interpreted to mean "including, but not limited to . . . ". Any use of any form of the terms "connect", "engage", "couple", "attach", or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

FIG. 1 is a schematic diagram illustrating an embodiment of a well system 10. The well system 10 can be configured to extract various minerals and natural resources, including hydrocarbons (e.g., oil and/or natural gas), or configured to inject substances into an earthen surface 3 and a subterranean earthen formation 5 via a well or wellbore 12. In some embodiments, the well system 10 is land-based, such that the surface 3 is a land surface, or subsea, such that the surface 3 is a sea floor. In the embodiment of FIG. 1, well system 10 generally includes a drilling rig or platform 20 disposed at the surface 3, a well or drill string 22 extending downhole from rig 20 through wellbore 12, a bottomhole assembly (BHA) 24 coupled to the lower end of drill string 22, and a drill bit 26 attached to the lower end of BHA 23 and disposed at a lower end of the wellbore 12. Though the description herein may primarily refer to a drill string, it is understood that other types of well or tool strings can extend into the wellbore 12.

In this embodiment, well system 10 further includes a mast 28, a travelling block 30, a standpipe 32, a fluid line or mud return line 34, a mud tank 36, and a mud pump 38. The drill string 22 is suspended from travelling block 30, which is in turn supported by mast 28. Drilling fluid is pumped into an upper end of drill string 22 via standpipe 32, where the drilling fluid is pumped through a passage of drill string 22 down to the drill bit 26. The drilling fluid is pumped through ports in the drill bit 26 and recirculated to the surface 3 through an annulus of wellbore 12 formed between an inner surface 14 of the wellbore 12 and an outer surface of drill string 22. At the surface 3 the recirculated drilling fluid is flowed through the mud return line 34 into the mud tank 36. Mud pump 38 is configured to pump drilling fluid disposed in mud tank 36 back to the standpipe 32 such that the drilling fluid may be flowed back into the passage of the drill string 22. Well system 10 may further include other components, such as shale shakers, for removing entrained cuttings and other debris in the recirculated drilling fluid passing through mud return line 34 prior to being flowed back into the standpipe 32 by mud pump 38.

As will be discussed further herein, in this embodiment the mud return line 34 includes a flow sensor assembly 100 configured for measuring the flow rate of drilling fluid passing through the mud return line 34 by detecting the flow level or fluid height of fluid passing therethrough. Particularly, flow sensor assembly 100 is configured to measure the height or fluid level of a fluid flow passing through mud return line 34. In an embodiment, measurements of the fluid flow rate through mud return line 34 are used to monitor the drilling fluid balance in wellbore 12. The drilling fluid balance in wellbore 12 may be monitored for several reasons, including for detecting the presence of a "kick" in wellbore 12. For instance, if the flow rate of fluid through mud return line 34, as measured using flow sensor assembly 100, exceeds the flow rate of fluid entering the drill string 22 via standpipe 32, then a fluid or gas influx (i.e., a "kick") has taken place, with fluid or gas entering the wellbore 12 from the subterranean formation 5. The presence of a fluid or gas influx into the wellbore 12 may necessitate corrective action to regain control over the wellbore 12 of well system 10. Thus, accurate measurements from flow sensor assembly 100 can be important for monitoring the influx of fluids into wellbore 12. In this embodiment, flow sensor assembly 100 is in fluid communication with a pressurized fluid source 50 of well system 10. Although flow sensor assembly 100 is shown in FIG. 1 as a component of well system 10, in other embodiments, flow sensor assembly 100 may be utilized in other well systems. Moreover, flow sensor assembly 100 may be utilized in other industrial applications besides well systems that require the measurement of a fluid level in a vessel or conduit. For example, the sensor assembly 100 may be coupled to a line containing fluids other than drilling mud.

Figure 2A:
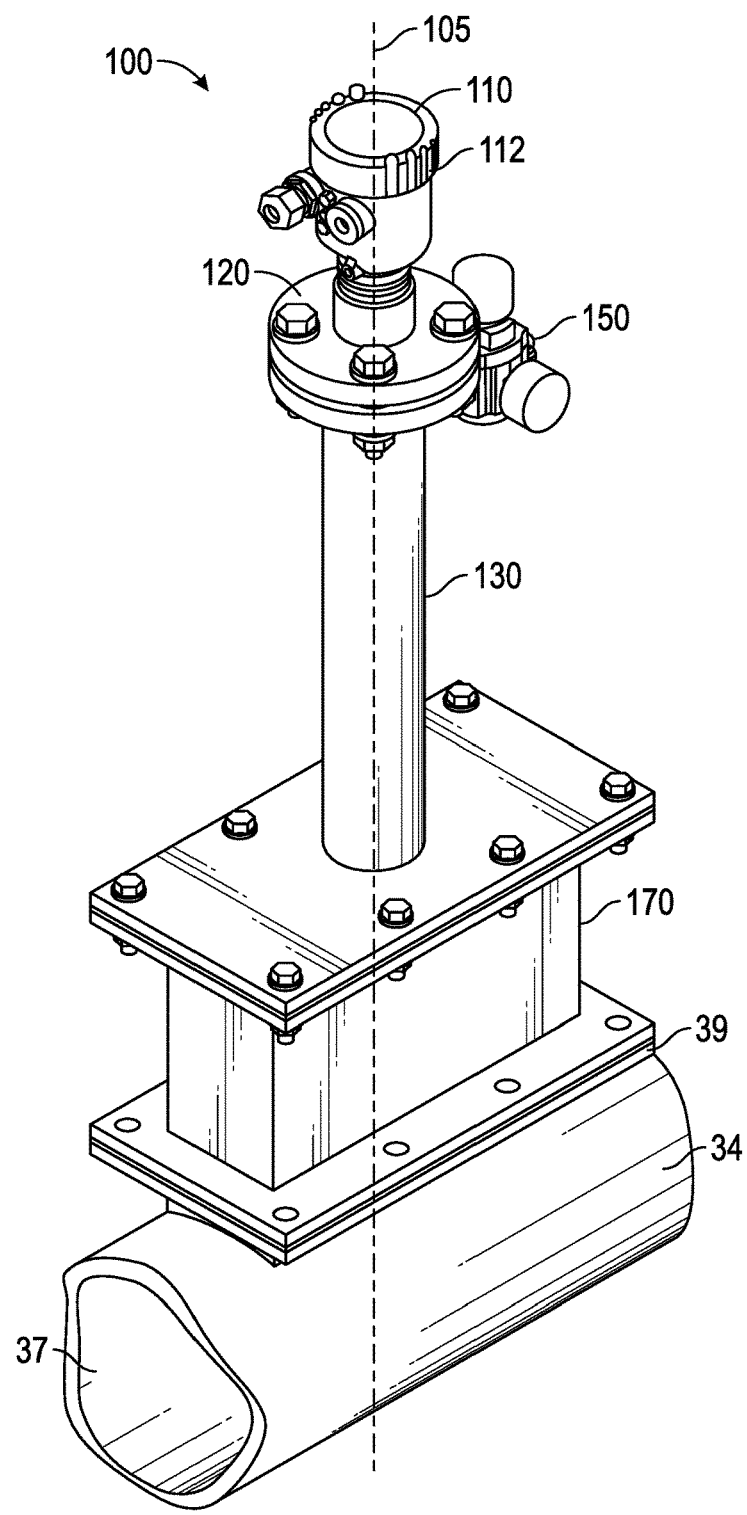
FIG. 2A is a perspective view of an embodiment of a flow sensor assembly of the well system of FIG. 1 in accordance with principles disclosed herein.
Figure 2B:
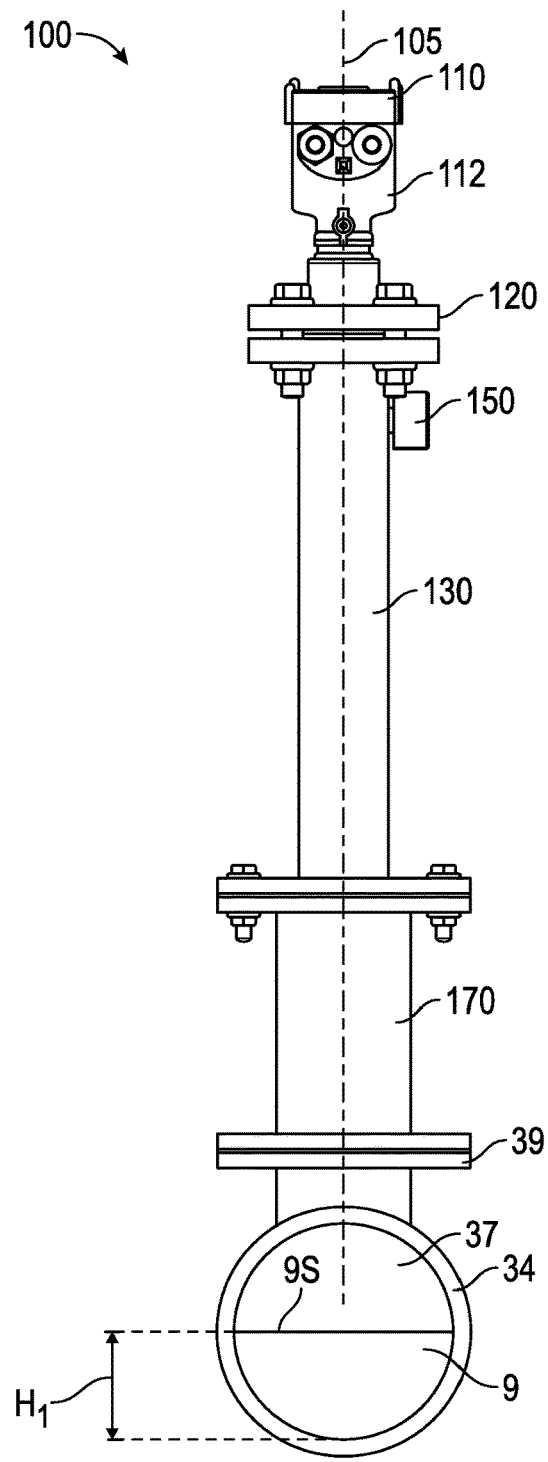
FIG. 2B is a front view of the flow sensor assembly of FIG. 2A.
Figure 2C:
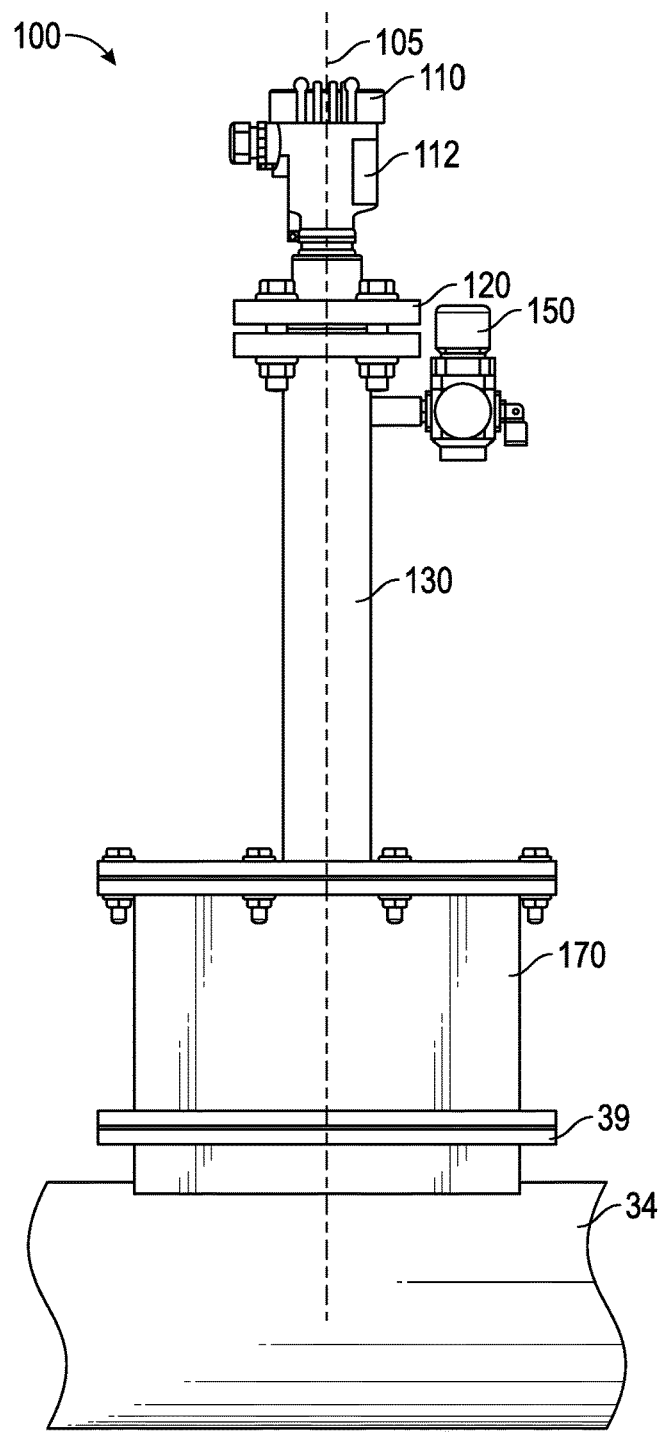
FIG. 2C is a side view of the flow sensor assembly of FIG. 2A.
Figure 3:
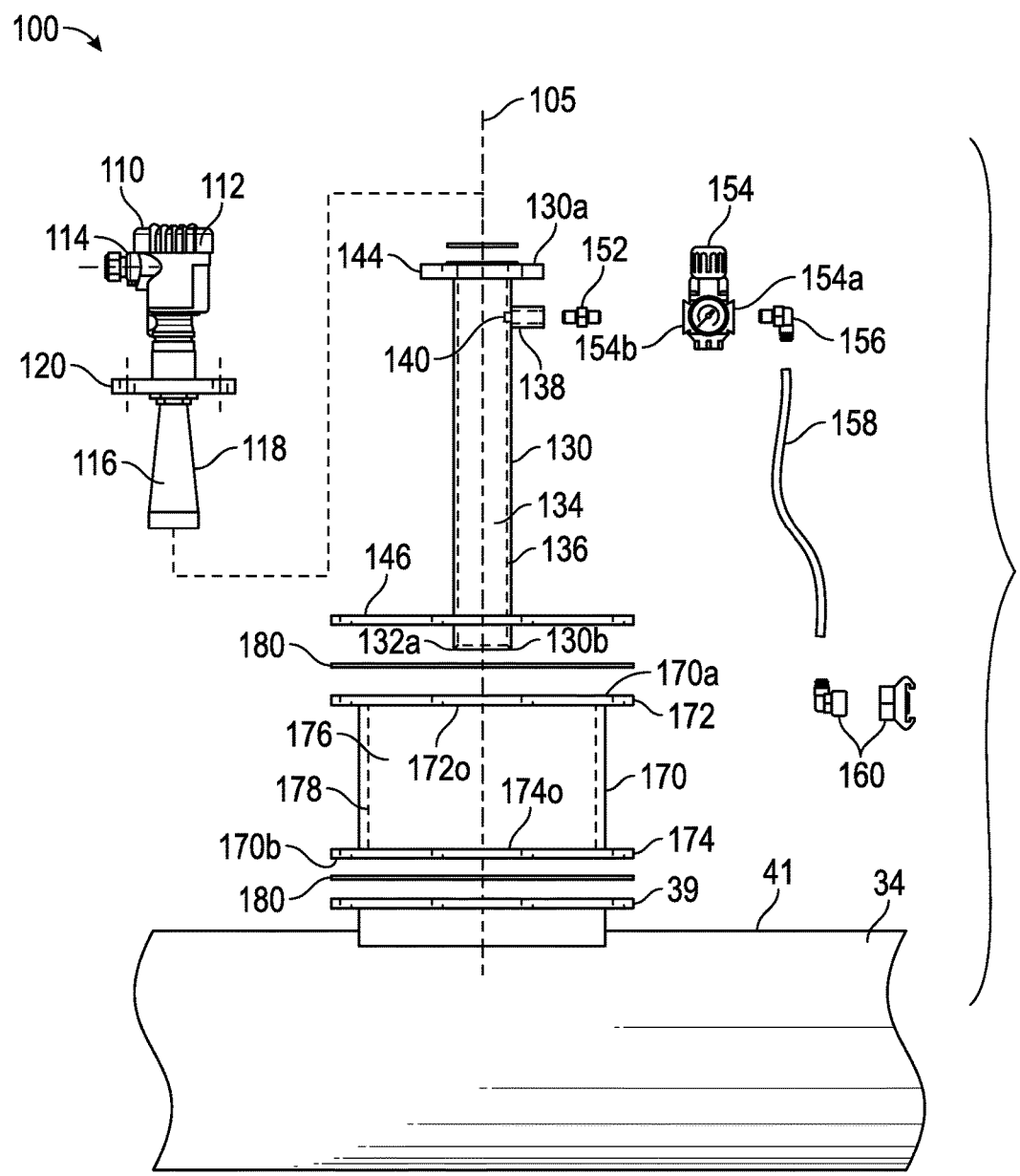
FIG. 3 is an exploded side view of the flow sensor assembly of FIG. 2A.
Figure 4:
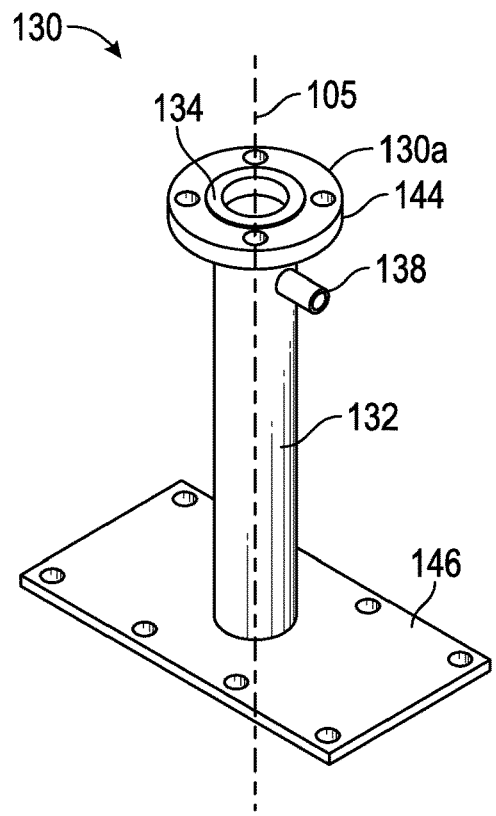
FIG. 4 is a perspective view of an embodiment of a housing of the flow sensor assembly of FIG. 2A.
Figure 5:
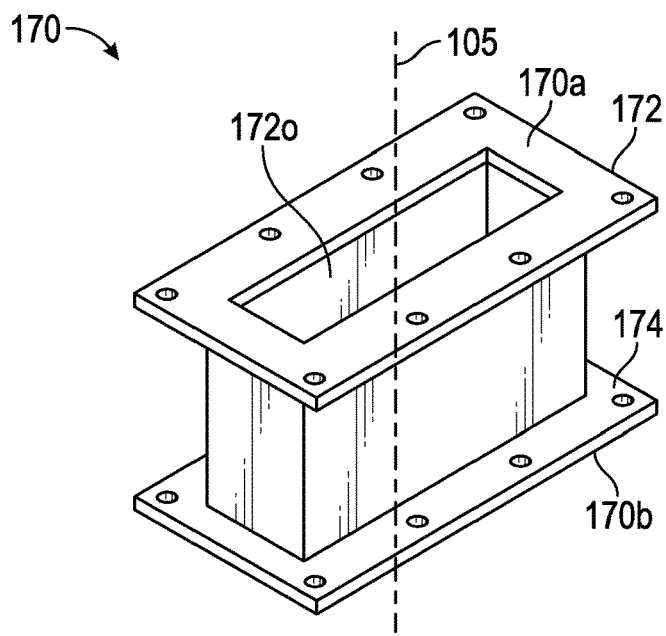
FIG. 5 is a perspective view of an embodiment of a spacer of the flow sensor assembly of FIG. 2A.

Referring to FIGS. 2A-2C, an embodiment of the flow sensor assembly 100 is shown. In the embodiment of FIGS. 2A-2C, flow sensor assembly 100 has a central or longitudinal axis 105, and generally includes a sensor assembly 110, a sensor housing 130, a pressure regulator assembly 150, and a spacer member 170. Sensor assembly 110 generally includes a flow sensor 112 and a sensor flange 120 for coupling sensor assembly 110 to sensor housing 130. In this embodiment, flow sensor 112 comprises a non-contact radar level measurement sensor, such as the VEGAPULS 62 radar level measurement sensor provided by VEGA Grieshaber KG, located at Am Hohenstein 113, 77761 Schiltach, Germany. However, in other embodiments flow sensor 112 may comprise other flow level measurement sensors known in the art. As shown particularly in FIG. 2B, flow sensor 112 is configured to continuously measure the height $H_1$ of fluid 9 (e.g., drilling fluid) passing through an internal passage 37 of mud return line 34. By measuring the height $H_1$ of the fluid 9, the flow rate of fluid 9 through mud return line 34 may be determined in light of the dimensions of mud return line 34 and the properties (e.g., density) of fluid 9 flowing therein. Specifically, in this embodiment flow sensor 112 is configured to determine the value of $H_1$ by transmitting a radar signal that is reflected off the surface 9s of the fluid 9 back to flow sensor 112, providing flow sensor 112 with the distance between flow sensor 112 and the surface 9s of fluid 9. By calibrating flow sensor 112 with the height of sensor housing 130, spacer 170, and the size of mud return line 34, height $H_1$ of the fluid 9 may thereby be computed.

Referring to FIGS. 3-6B, flow sensor 112 includes an electronics module 114 coupled to an antenna 116 extending therefrom, where antenna 116 has a generally conical outer surface 118. Electronics module 114 includes electronics (e.g., a processor, memory, etc.) for operating flow sensor 112 while antenna 116 is configured to transmit and receive electromagnetic (e.g., radar) signals. Flange 120 is affixed to an outer surface of electronics module 114 and is configured to releasably couple flow sensor 112 with sensor housing 130.

Sensor housing 130 is generally configured to distance flow sensor 112 from fluid 9 (shown in FIGS. 6A and 6B) and is disposed coaxially with longitudinal axis 105 of flow sensor assembly 100, and has a first or upper end 130a, and a second or lower end 130b. In this embodiment, sensor housing 130 generally includes a cylindrical or tubular member 132 extending between upper end 130a and lower end 130b, a first or upper flange 144, and a second or lower flange 146. Upper flange 144 is coupled to tubular member 132 at upper end 130a while lower flange 146 is coupled to tubular member 132 proximal lower end 130b. Upper flange 144 is generally circular in cross-section and is configured to couple with sensor flange 120 of flow sensor 112, while lower flange 146 is generally rectangular in cross-section and is configured to couple with spacer 170. As shown particularly in FIG. 3, a second or lower end 132a of tubular member 132 is disposed at a distance from a lower surface of lower flange 146. In this arrangement, the lower end 132a of tubular member 132 extends a distance $D_2$ (shown in FIG. 6A) into the chamber 176 of spacer 170. Tubular member 132 includes a centrally disposed passage 134 defined by a generally cylindrical inner surface 136. While in this embodiment tubular member 132 is generally tubular in shape, in other embodiments tubular member 132 may comprise other shapes. For instance, in other embodiments, tubular member 132 may be boxed-shape having a generally rectangular cross-section.

In this embodiment, tubular member 132 of sensor housing 130 includes a generally cylindrical fluid inlet 138 that extends radially from an outer surface of tubular member 132 proximal the upper end 130a of sensor housing 130. Tubular member 132 also includes a radial port or nozzle 140 that extends radially through tubular member 132 and is in fluid communication with fluid inlet 138. Radial port 140 is disposed coaxially with fluid inlet 138. Fluid inlet 138 is configured to couple with pressure regulator assembly 150 and to provide a fluid conduit for the inlet of pressurized fluid to the passage 134 of tubular member 132. In some embodiments, radial port 140 has a diameter that is less than the diameter of fluid inlet 138, and is thereby configured to act as a nozzle and increase the velocity of fluid flowing through radial port 140 as the fluid enters passage 134 of tubular member 132. Particularly, radial port 140 is configured to direct a high velocity jet, stream, or spray of fluid against the inner surface 136 of tubular member 132 and/or the outer surface 118 of antenna 116 to remove condensation, humidity, and other materials (e.g., dirt, grime, particulates, fluids, etc.) disposed thereon, as will be discussed further herein. However, in other embodiments, fluid inlet 138 does not include radial port 140, and instead, includes a passage having a diameter substantially equal to the diameter of inlet 138 for providing fluid communication with passage 134 and removing condensation, humidity, and other materials (e.g., dirt, grime, particulates, fluids, etc.) disposed thereon, as will be discussed further herein. In certain embodiments, the passage of a fluid flow into passage 134 from inlet 138 is configured to remove or reduce humidity disposed within passage 134 of tubular member 132. While in this embodiment tubular member 132 only includes a single fluid inlet 138, in other embodiments tubular member 132 may include a plurality of fluid inlets for providing a fluid flow to passage 134, where the plurality of fluid inlets may be disposed in various positions on the outer surface of tubular member 132.

Pressure regulator assembly 150 of flow sensor assembly 100 is generally configured to provide pressurized fluid to fluid inlet 138 of tubular member 132. Particularly, pressure regulator assembly 150 is configured to provide fluid to fluid inlet 138 at a predetermined and regulated pressure. In this embodiment, pressure regulator assembly 150 is configured to provide a fluid to fluid inlet 138 at approximately 2 bar or 29 pounds per square inch (PSI); however, in other embodiments pressure regulator assembly 150 may be configured to provide fluid at varying pressures. As shown particularly in FIG. 3, in this embodiment pressure regulator assembly 150 generally includes a connector 152, a pressure regulator 154, an elbow 156, a flexible conduit 158, and a switch 160. Connector 152 couples with fluid inlet 138 of tubular member 132 and pressure regulator 154 to provide a sealed fluid connection between fluid inlet 138 and pressure regulator 154.

In this embodiment, pressure regulator 154 has an inlet 154a, an outlet 154b, and is configured to provide a fluid to outlet 154b that is continuously uniform or regulated in pressure, where fluid is supplied to pressure regulator 154 from inlet 154a. The pressure of fluid flowing from outlet 154b of pressure regulator 154 may be preset to a predetermined level, such as 2 bar in this embodiment. Elbow 156 and flexible conduit 158 are configured to supply fluid to inlet 154a of pressure regulator 154. Particularly, elbow 156 is sealably connected with inlet 154a, while flexible conduit 156 provides a sealed fluid connection between elbow 156 and switch 160.

Switch 160 of pressure regulator assembly 150 provides a selectable fluid connection with the pressurized fluid source 50 of the well system 10 shown in FIG. 1. Particularly, switch 160 includes an open position providing for fluid communication between pressure regulator 154 and the fluid source 50 of well system 10, and a closed position restricting fluid communication between pressure regulator 154 and the fluid source 50, where switch 160 may be actuated between the open and closed positions either by personnel of well system 10 or automatically via an automated control system. Fluid source 50 shown in FIG. 1, from which fluid is received by switch 160, may comprise pressurized fluid bottles, accumulators, or other components of well system 10 configured for providing pressurized fluid. In this embodiment, the fluid source 50 of well system 10 provides pressure regulator system 150 with pressurized gas, particularly air; however, in other embodiments, the source of well system 10 may provide pressure regulator system 150 with other gasses (e.g., nitrogen, etc.) or liquids (e.g., water, etc.).

Spacer 170 of flow sensor assembly 100 couples between sensor housing 130 and a rectangular flange 39 that extends from an outer surface 41 of mud return line 34, where flange 39 includes a rectangular opening 390 disposed therein. Spacer 170 is generally configured to protect flow sensor 112 from splashing of the fluid 9 (shown in FIGS. 6A and 6B) passing through mud return line 34 and to provide for additional fluid volume in the event of an overflow of mud return line 34 by fluid 9. Spacer 170 is disposed coaxially with longitudinal axis 105, and has a first or upper end 140a, and a second or lower end 140b. In this embodiment, spacer 170 is generally box-shaped and includes a first or upper flange 172, a second or lower flange 174, and a chamber 176 defined by an inner surface 178 having a rectangular cross-section. Upper flange 172 is rectangular in shape and is configured to couple with lower flange 146 of tubular member 132 while lower flange 174 is rectangular in shape and is configured to couple with flange 39 of mud return line 34. Upper flange 172 includes a centrally disposed and rectangular in cross-section opening 172o while lower flange 174 similarly includes a centrally disposed and rectangular in cross-section opening 174o for providing fluid communication between passage 134 of tubular member 132 and the passage 37 of mud return line 34. A pair of rectangular gaskets 180 are included to provide a sealed connection between sensor housing 130 and mud return line 34, with a first gasket 180 disposed between lower flange 146 of tubular member 132 and the upper flange 172 of spacer 170, and a second gasket 180 disposed between lower flange 174 of spacer 170 and flange 39 of mud return line 34.

Figure 6A:
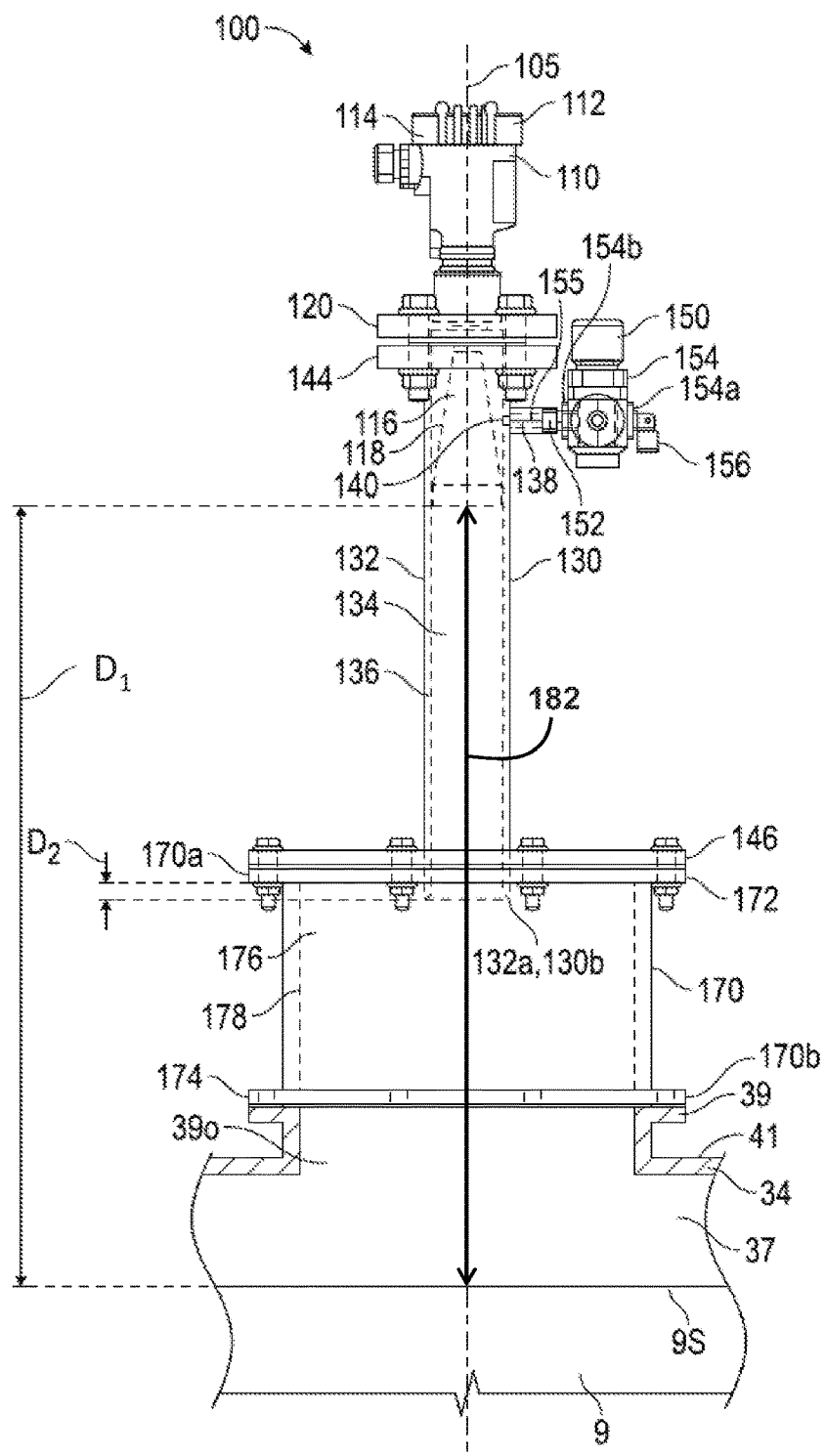
FIG. 6A is a cross-sectional side view of the flow sensor assembly of FIG. 2A.
Figure 6B:
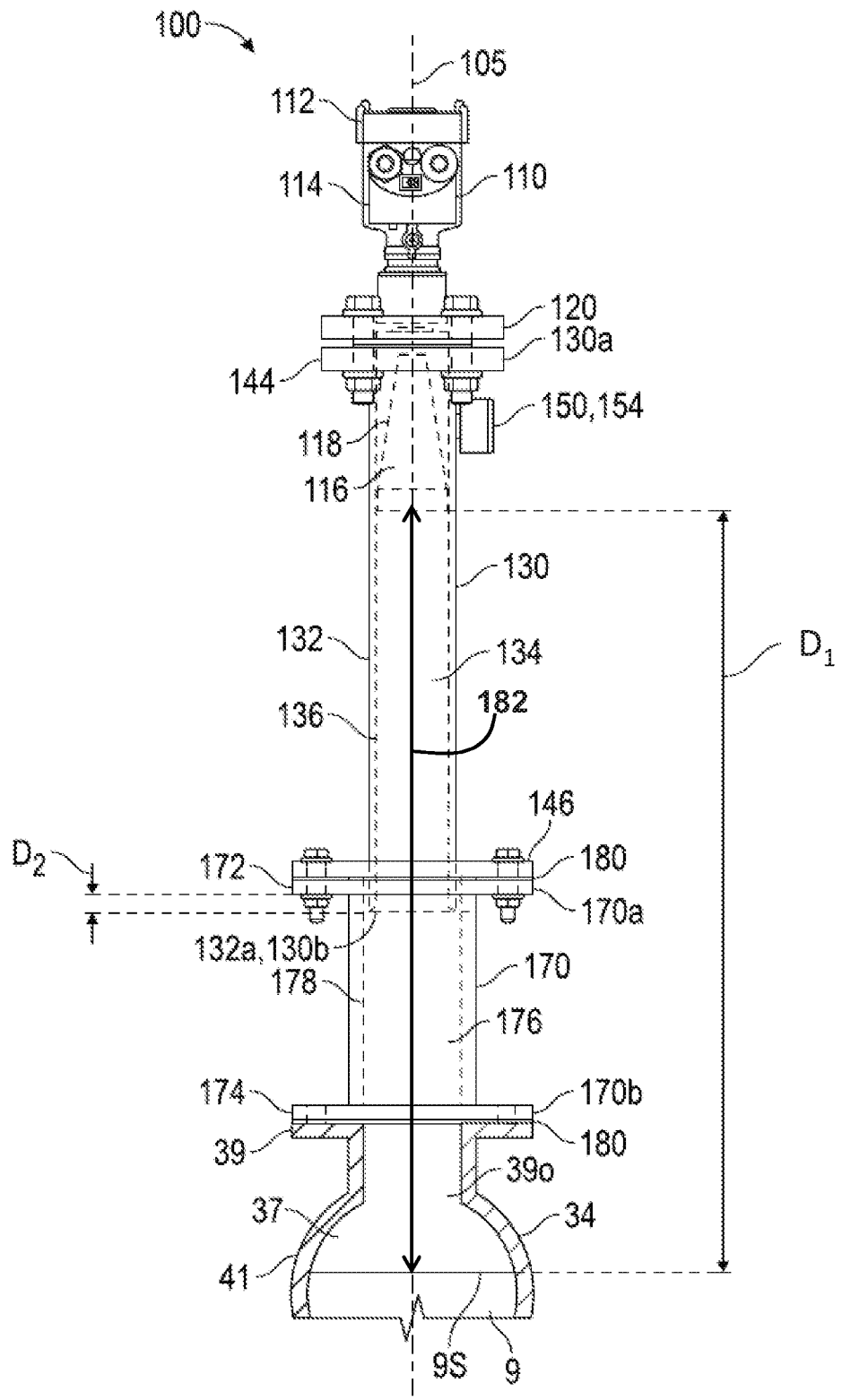
FIG. 6B is a cross-sectional front view of the flow sensor assembly of FIG. 2A.

Referring particularly to FIGS. 6A and 6B, antenna 116 of flow sensor 112 is configured to transmit a radar signal 182 (shown schematically in FIGS. 6A and 6B) in the direction of fluid 9 disposed in mud return line 34, which is reflected off of the surface 9s of fluid 9 and subsequently received by antenna 116. In this manner, flow sensor 112 may determine the distance $D_1$ between flow sensor 112 and the surface 9s of fluid 9, which corresponds to the flow rate of fluid 9 through mud return line 34. In some embodiments, the distance $D_2$ tubular member 132 extends into chamber 176 is configured to militate against any echoes or reflections of the radar signal 182 that could reduce the accuracy of the measurements made by flow sensor 112. As mentioned above, chamber 176 provides for additional fluid capacity in the event that the surface 9s of fluid 9 rises until fluid 9 is disposed within chamber 176. Chamber 176, which has a larger cross-sectional area than passage 134 of tubular member 132, is particularly configured to provide additional capacity for fluid 9 in the event of an overflow of mud return line 34. Due to the additional fluid capacity provided by chamber 176 of spacer 170, personnel of well system 10 will have more time to remove flow sensor 112 in the event of an overflow of mud return line 34 to prevent flow sensor 112 from being flooded or contacting the rising fluid 9, which could damage flow sensor 112.

As described above, fluid inlet 138 provides an inlet into passage 134 of tubular member 132 for a first or pressurized fluid 155 (shown in FIG. 6A) supplied by pressure regulator assembly 150, while, some embodiments, radial port 140 acts as a nozzle to provide for a high velocity jet of fluid against the inner surface 136 of tubular member 132 and/or the outer surface 118 of antenna 116. Particularly, condensation and other materials (e.g., dirt, grime, particulates, fluids, etc.) from a second or flowing fluid 9 may collect on the inner surface 178 of spacer 170 and the inner surface 136 of tubular member 132. Condensation may collect due to the relatively high temperature of flowing fluids 9 returning from the wellbore 12. The relatively reflective condensation collected on surfaces 178 and 136 may reflect a portion of the transmitted radar signal 182 back to the antenna 116, before the radar signal 182 has been transmitted to the surface 9s of fluid 9, thereby causing flow sensor 112 to incorrectly measure a relatively high rate of flow of fluid 9 through mud return line 34. Thus, in certain embodiments, the stream of fluid emitted from radial port 140, acting to forcibly displace or scatter any condensation collected on surface 136 and/or surface 178, thereby reduces the likelihood of the flow sensor 112 incorrectly reading the level of surface 9s of fluid 9 due to a reflection of the radar signal 182 off of collected condensation. In other words, the high velocity jet of fluid exiting radial port 140 acts to clean or remove condensation disposed on surfaces 136 and 178, thus mitigating the possibility of the transmitted radar signal 182 reflecting off of surfaces 136 and 178 back to antenna 116 and thereby providing an incorrect measurement of the position of surface 9s of fluid 9.

Figure 7:
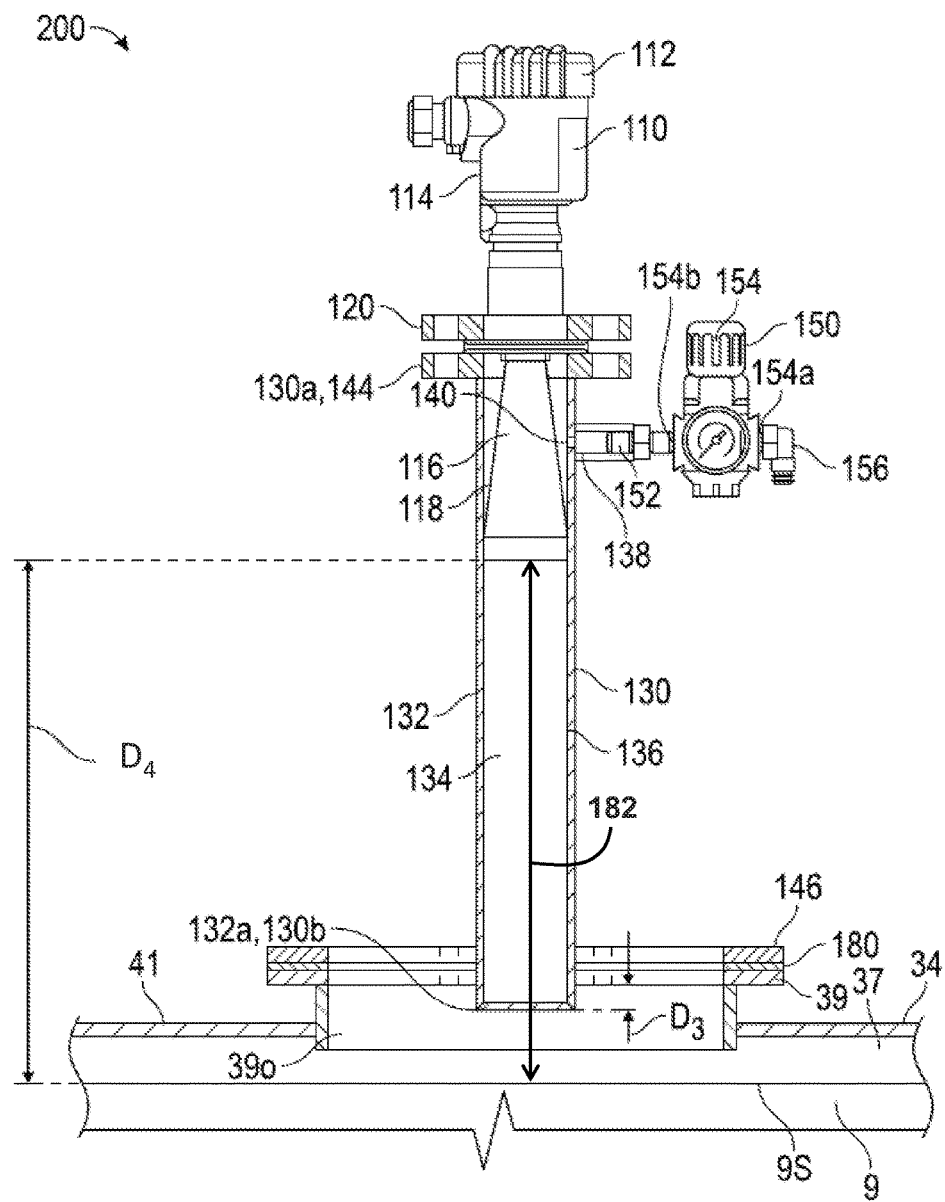
FIG. 7 is a side view of another embodiment of a flow sensor assembly in accordance with principles disclosed herein.

Referring to FIG. 7, an alternative embodiment of a flow sensor assembly 200 is shown coupled to mud return line 34 of well system 10. Flow sensor assembly 200 is similar to flow sensor assembly 100 shown in FIGS. 2A-6B, except that flow sensor assembly 200 does not include spacer 170. Instead, the lower flange 146 of sensor housing 130 couples directly with the flange 39 of mud return line 34. In this arrangement, the lower end 132a of tubular member 132 extends a distance $D_3$ into the opening 390 of flange 39. Further, in this embodiment the flow sensor 112 is disposed at a distance $D_4$ from the surface 9s of fluid 9 flowing through mud return line 34, where distance $D_4$ is less than the distance $D_1$ between the flow sensor 112 and surface 9s of fluid 9 in flow sensor assembly 100. As described and illustrated above, in some embodiments, flow sensor assemblies (e.g., flow sensor assembly 10) include flow sensors (e.g., flow sensor 112) with direct or unimpeded line of to the surface 9s of fluid 9. However, in other embodiments, the flow sensor does not have a direct or unimpeded line of sight to the surface 9s of fluid 9. For instance, in some embodiments, the flow sensor has a line of sight that is perpendicular or orthogonal to the surface 9s of fluid 9, such that the flow sensor is not in the line of sight of the surface 9s of fluid 9. In these embodiments, a reflector may be used to refract the radar signal of the flow sensor such that the radar signal may pass from the flow sensor to the orthogonally or perpendicularly disposed surface 9s of fluid 9. In certain embodiments, the flow sensor has a line of sight directly exposed to the surface 9s of fluid is offset or spaced apart from the surface 9s of fluid 9.

Figure 8:
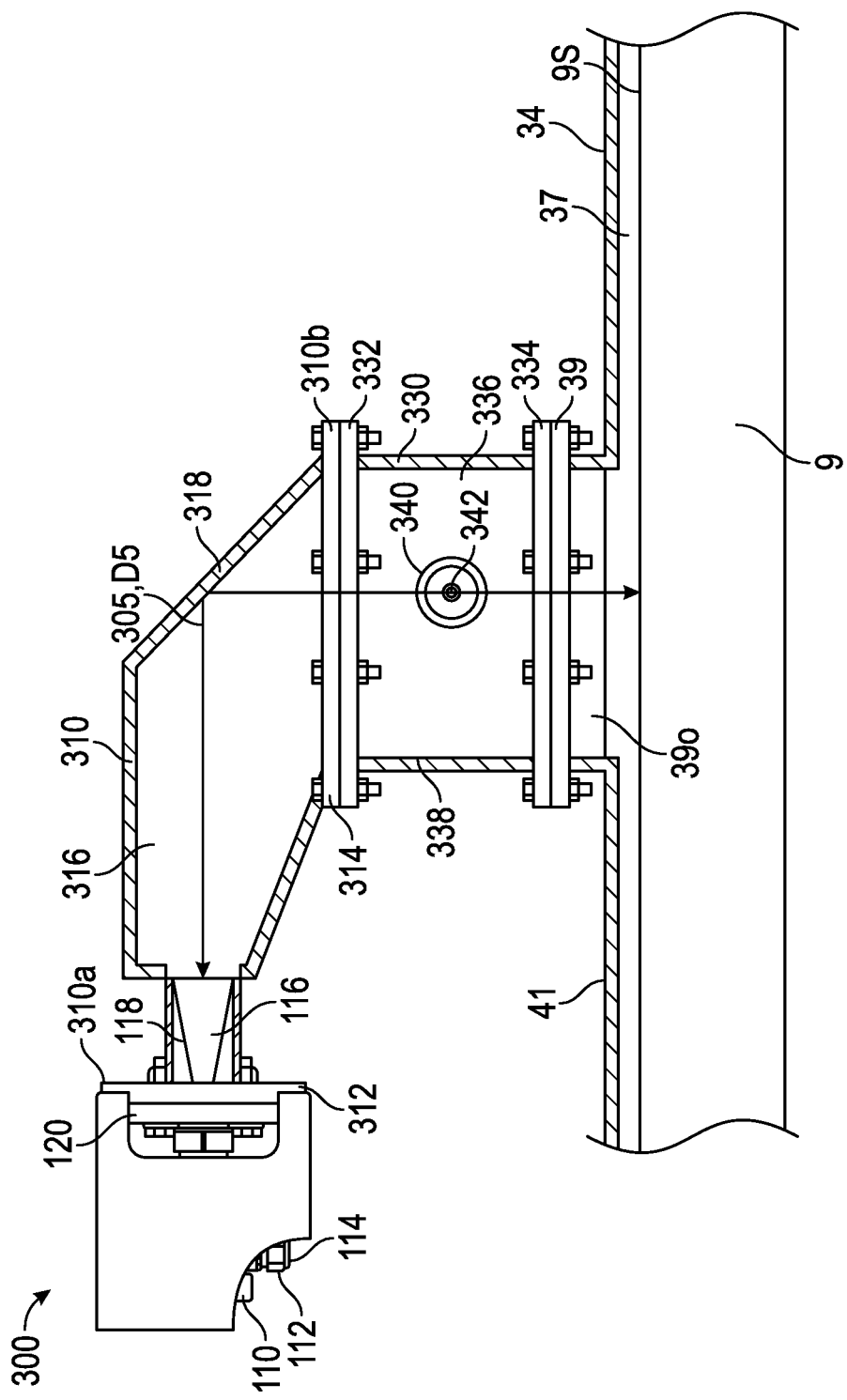
FIG. 8 is a side view of another embodiment of a flow sensor assembly in accordance with principles disclosed herein.
Figure 9:
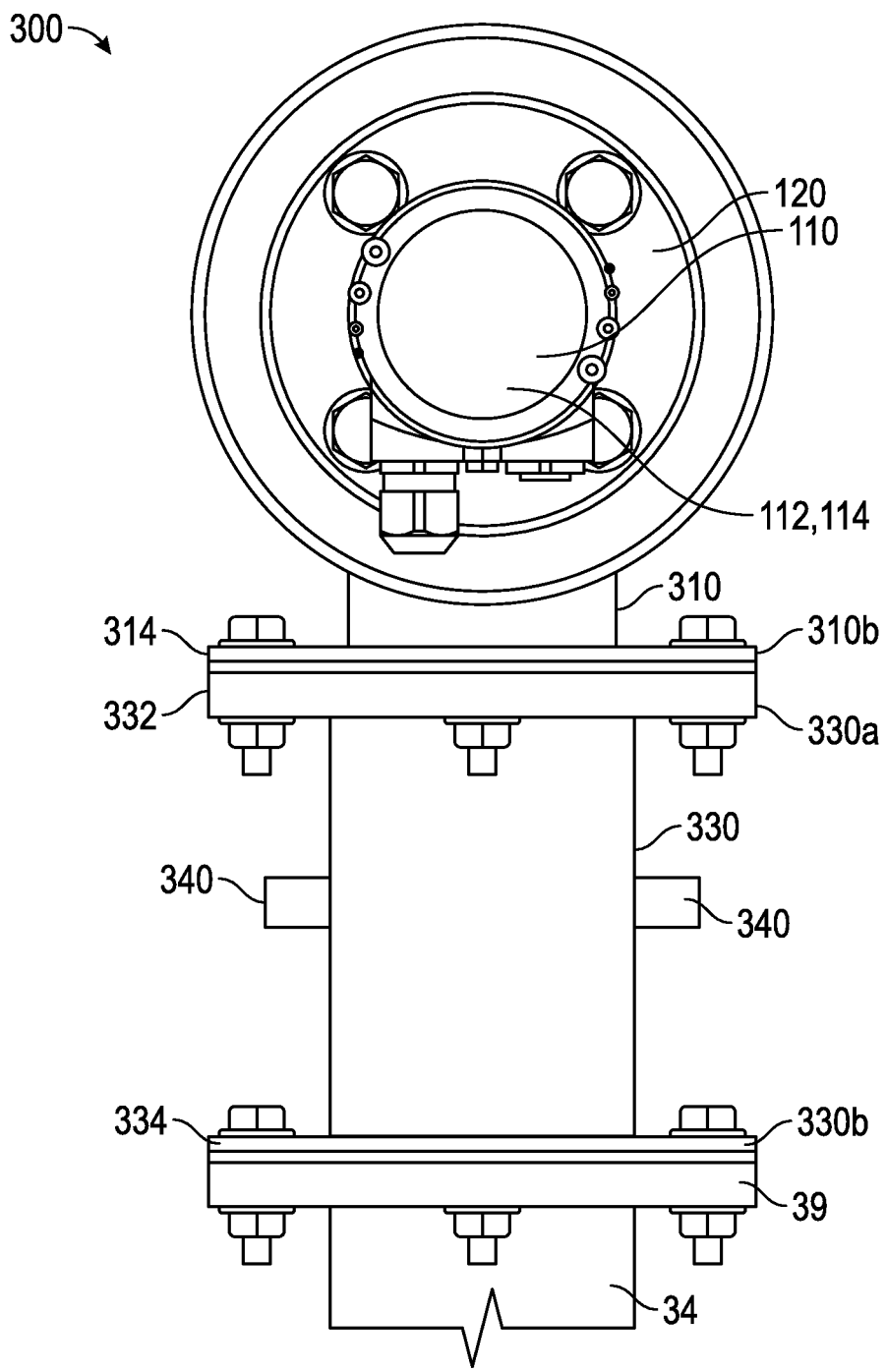
FIG. 9 is a front view of the flow sensor assembly of FIG. 8.
Figure 10:
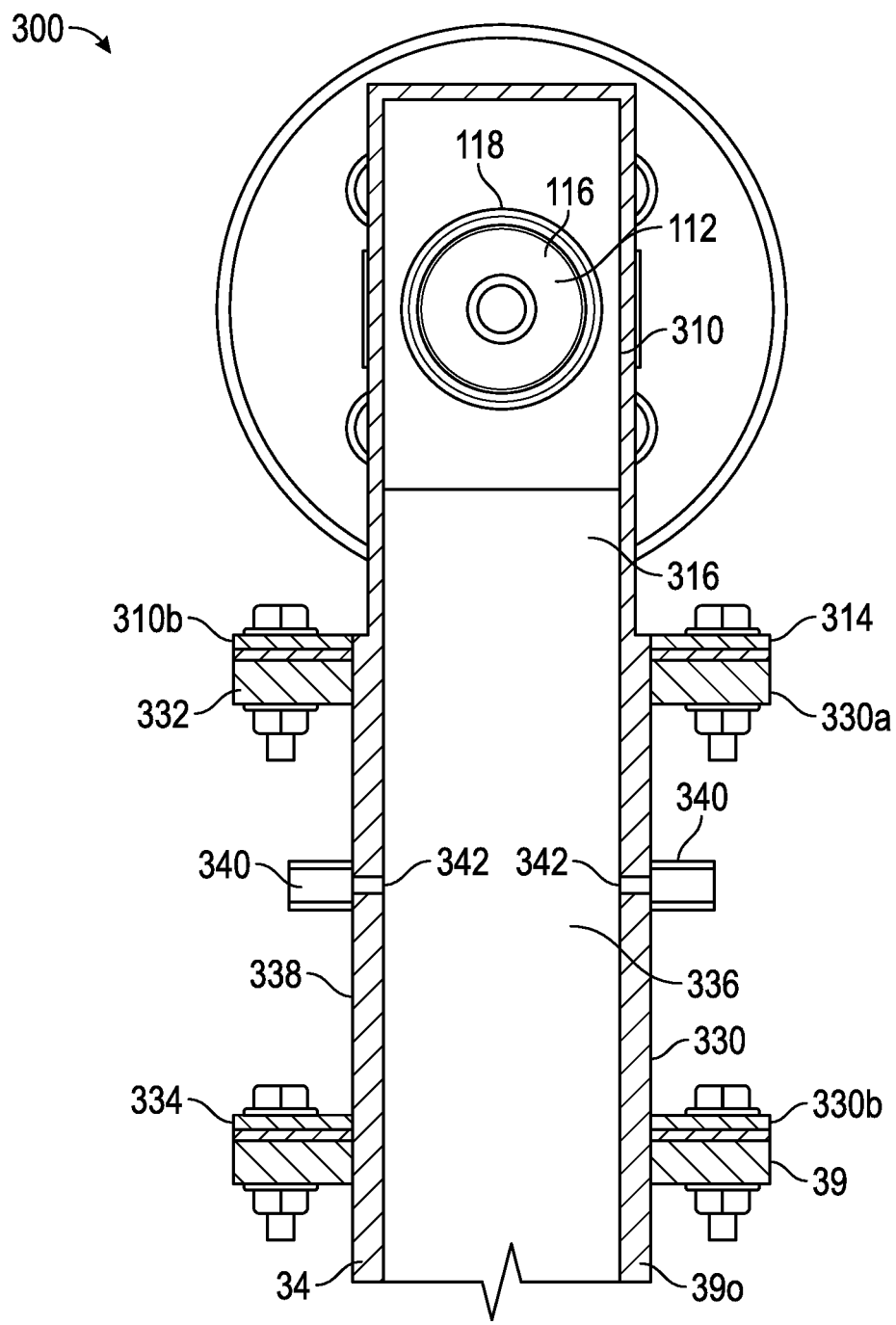
FIG. 10 is a rear cross-sectional view of the flow sensor assembly of FIG. 8.

Referring to FIGS. 8, 9A, and 9B, a further embodiment of a flow sensor assembly 300 is shown coupled to mud return line 34 of well system 10. Flow sensor assembly 300 includes similar features as with the previously described flow sensor assembly 100, and shared features are labeled similarly. In the embodiment of FIGS. 8-9B, flow sensor assembly 300 generally includes sensor assembly 110, a reflector housing 310, and a spacer member 330. Reflector housing 310 couples between sensor assembly 110 and spacer 330 and is generally configured to reflect or refract a radar signal 305 (shown schematically in FIG. 8) transmitted by flow sensor 112, and extends a distance $D_5$, such that the transmitted radar signal 305 refracts off of a surface of reflector housing 310 and is directed against the surface 9s of fluid 9 disposed in mud return line 34, and reflected back to flow sensor 112 in the same manner. Particularly, reflector chamber 310 includes a first end 310a comprising a first flange 312 for coupling with flange 120 of sensor assembly 110, and a second end 310b comprising a second flange 314 for coupling with spacer 330. Reflector chamber 310 also includes a chamber 316 defined by an inner surface 318, where a portion of the inner surface 318 is positioned or configured to refract the radar signal 305 in the direction of the surface 9s of fluid 9.

In this embodiment, spacer 330 has a first or upper end 330a comprising a first flange 332 for coupling with flange 314 of reflector chamber 310, and a second or lower end 330b comprising a second flange 334 for coupling with flange 39 of mud return line 34. Spacer 330 also comprises a chamber 336 defined by an inner surface 338, where chamber 336 is in fluid communication with chamber 316 of reflector chamber 310. Spacer 330 further includes a pair of fluid inlets 340 extending from an outer surface of spacer 330 for providing a fluid flow into chamber 336 from a pressure regulator connected with a fluid supply, such as the previously described pressure regular assembly 150. Fluid inlets 340 are configured similarly as fluid inlets 138 of flow sensor assembly 100, and in this embodiment, each fluid inlet 340 is disposed on an opposing side of spacer 330. While in this embodiment spacer 330 is described as having a pair of fluid inlets 340, in other embodiments, spacer 330 may comprise a single fluid inlet 340, or more than two fluid inlets 340. Moreover, in other embodiments, fluid inlets 340 may be included in reflector chamber 310.

In this embodiment, a plurality of radial ports or nozzles 342 extends through spacer 330, where each radial port 342 is disposed coaxially with a corresponding fluid inlet 340. As with radial ports 140 of flow sensor assembly 100, radial ports 342 are configured to act as nozzles and direct a high velocity stream of fluid against the inner surface 338 of spacer 330 and/or the inner surface 318 of reflector chamber 316. While in this embodiment each fluid inlet includes a radial port 342, in other embodiments, fluid inlets 340 do not include radial ports 342, and instead, include a passage for providing fluid communication between inlets 340 and chamber 336 and direct a fluid flow against the inner surface 338 of spacer 330. In this arrangement, the fluid passed to chamber 336 from inlets 340 act to displace or scatter condensation collected on inner surfaces 338 and 318, where condensation collected on inner surfaces 338 and 318 may produce error in the measurements provided by flow sensor 112 by reflecting at least a portion of the radar signal 305 back to the flow sensor 112 before the radar signal 305 has reached the surface 9s of fluid 9. In certain embodiments, spacer 330 and reflector chamber 316 mitigate the possibility of the antenna 116 of sensor 112 being splashed by fluid 9 with antenna 116 being disposed such that the surface 9s of fluid 9 is not within the line of sight of antenna 116, unlike the embodiments described above. Also unlike the embodiments described above, the path of radar signal 305 is not linear, and is instead, refracted off of inner surface 318 of reflector chamber 316. Also, in this embodiment, the volume of the chamber 336 of spacer 330 provides for additional fluid capacity in the event of an overflow of passage 37 of mud return line 34.

Figure 11:
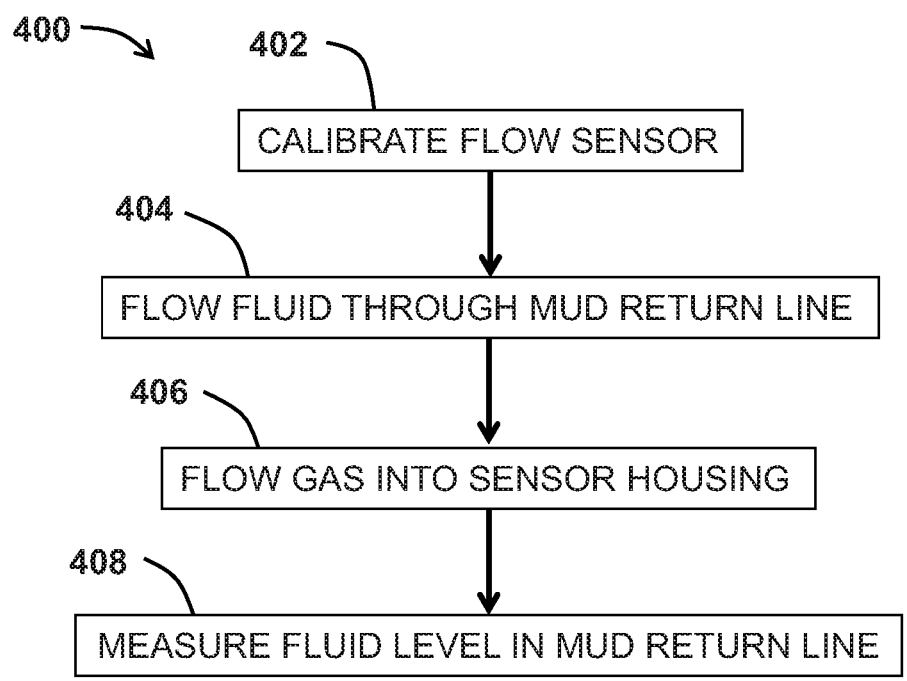
FIG. 11 is a flowchart illustrating an embodiment of a method for measuring a flow rate in accordance with principles disclosed herein.

Referring to FIGS. 6A, 6B, and 11, an embodiment of a method 400 for measuring a fluid flow rate in mud return line 34 of well system 10 is shown in FIG. 11. Starting at block 402, the flow sensor 112 of flow sensor assembly 100 is calibrated. Particularly, the electronics module 114 of flow sensor 112 is programmed to account for the distance between the antenna 116 and the mud return line 34, including, for example, the longitudinal length of the sensor housing 130, spacer 170, and the size of mud return line 34, among other possible parameters. Following calibration, flow sensor 112 is configured to measure the distance between antenna 116 and the surface 9s of fluid 9 flowing through mud return line 34. In certain embodiments, block 402 also includes calibrating the pressure regulator 154 to supply fluid inlet 138 with fluid (e.g., gas, liquid, etc.) at a predetermined, selected pressure. In this embodiment, the pressure regulator 154 is calibrated to supply fluid inlet 138 with a fluid having a pressure of approximately 2 bar, while in other embodiments, pressure regulator 154 may be calibrated to varying pressures. At block 404, fluid 9 is flowed through mud return line 34 of well system 10. While block 404 follows block 402 in FIG. 11, fluid 9 may flow through mud return line 34 continuously, preceding the steps illustrated at block 402.

At block 406 of method 400, gas supplied to pressure regulator assembly 150 by the fluid source 50 of well system 10 is flowed through fluid inlet 138 and into passage 134 of tubular member 132 to blow, disperse, and/or scatter condensation, humidity, and/or other materials (e.g., dirt, grime, particulates, fluids, etc.) disposed on the inner surface 136 of tubular member 132 and inner surface 178 of spacer 170 to mitigate the possibility of radar signal 182 being reflected back to antenna 116 via the condensation. This step may also include flowing the fluid through a radial port 140 of tubular member 132 to create a high velocity jet or spray of fluid for removing the condensation and other materials disposed on surfaces 136 and 178. In certain embodiments, this step comprises flowing pressurized air At block 408, flow sensor 112 is utilized to measure the flow level (e.g., the height $H_1$ of fluid 9 shown in FIG. 2B) of fluid 9 as fluid 9 flows through mud return line 34 by transmitting radar signal 182 from antenna 116, and reflecting the transmitted radar signal 182 off of the surface 9s of fluid 9 and back to antenna 116. Although method 400 is described above with reference to well system 10 and flow sensor assembly 100, in other embodiments, the steps of method 400 may be performed utilizing other systems and flow sensor assemblies.

Thus, in various embodiments described above, a chamber may be provided between the main fluid flow line and a sensor mounted thereon. The chamber may comprise multiple components, such as a sensor housing and a spacer. The chamber and/or spacer may act as a buffer between the sensor and the fluid flowing in the fluid flow line, to prevent splashing fluid from contacting or otherwise interrupting the operation of the sensor. The chamber and/or spacer may provide additional volume in the event that the fluid flow line is overflowed, preventing the overflow of fluid from reaching and potentially damaging or interrupting the operation of the sensor. The chamber may be equipped with a port or nozzle for receiving and injecting another fluid into the chamber. The injected fluid may be directed at the sensor, or other portions of the chamber. The injection of the fluid into the chamber may reduce or scatter condensation, dirt, grime, or other materials disposed on the inner surface of the chamber. The injection of the fluid into the chamber may also reduce the humidity of fluid (e.g., air warmed by fluid flowing through the fluid flow line) disposed in the chamber. The line of sight of the sensor may be through the chamber and directly onto the flowing fluid in the main flow line, or may be reflected or otherwise indirectly provided through the chamber via a reflector disposed between the sensor and the fluid flow line.

The above discussion is meant to be illustrative of the principles and various embodiments of the present disclosure. While certain embodiments have been shown and described, modifications thereof can be made by one skilled in the art without departing from the spirit and teachings of the disclosure. The embodiments described herein are exemplary only, and are not limiting. Accordingly, the scope of protection is not limited by the description set out above, but is only limited by the claims which follow, that scope including all equivalents of the subject matter of the claims.

What is claimed is:

1. A flow sensor assembly, comprising:
a housing configured to couple to a fluid line, wherein the housing comprises an inlet for receiving a flow of a first fluid comprising a gas; and
a sensor coupled to the housing and configured to measure a flow level of a second fluid comprising a liquid passing through the fluid line.

2. The flow sensor assembly of claim 1, wherein the housing comprises an inner surface and the inlet of the housing is configured to direct the first fluid against the inner surface of the housing.

3. The flow sensor assembly of claim 1, wherein the housing comprises a nozzle in fluid communication with the inlet, and wherein the nozzle is configured to increase the velocity of the first fluid as it is emitted from the nozzle.

4. The flow sensor assembly of claim 1, further comprising a pressure regulator coupled to the inlet of the housing for directing the flow of the first fluid into the housing at a selected pressure.

5. The flow sensor assembly of claim 4, wherein the pressure regulator is configured to supply the inlet of the housing with the flow of the first fluid pressurized to approximately 2 bar.

6. The flow sensor assembly of claim 1, further comprising a spacer coupled between the housing and the fluid line.

7. The flow sensor assembly of claim 6, wherein the spacer comprises a chamber having a larger cross-sectional area than a cross-sectional area of a chamber of the housing.

8. The flow sensor assembly of claim 6, wherein the spacer comprises an inlet for receiving the flow of the first fluid.

9. The flow sensor assembly of claim 1, wherein the inlet is configured to direct the first fluid against the inner surface of the housing to disperse condensation disposed on the inner surface of the housing.

10. A well system, comprising:
a well string disposed in a wellbore extending into a subterranean formation;
a fluid line extending from the wellbore, wherein the fluid line is configured to direct a flow of a wellbore fluid from the wellbore; and
a flow sensor assembly coupled to the fluid line, the flow sensor assembly comprising:
a housing configured to couple to the fluid line, wherein the housing comprises an inlet configured to direct a pressurized fluid against an inner surface of the housing;
a sensor coupled to the housing and configured to measure a flow level of the wellbore fluid passing through the fluid line; and
a pressure regulator coupled to the inlet of the housing and configured to supply the pressurized fluid to the housing.

11. The well system of claim 10, wherein the housing of the flow sensor assembly comprises a nozzle in fluid communication with the inlet, and wherein the nozzle is configured to increase the velocity of the pressurized fluid as it is emitted from the nozzle.

12. The well system of claim 10, wherein the pressure regulator is configured to supply the pressurized fluid to the housing at a selected pressure.

13. The well system of claim 10, wherein an antenna of the sensor is in the line of sight of the wellbore fluid.

14. The well system of claim 10, wherein an antenna of the sensor is not in the line of sight of the wellbore fluid.

15. The well system of claim 14, wherein the inlet is configured to direct the pressurized fluid against a surface of the sensor.

16. The well system of claim 10, wherein the flow sensor assembly further comprises a spacer coupled between the housing and the fluid line.

17. A method of measuring a fluid flow rate, comprising:
directing a fluid flow of a first fluid comprising a gas against an inner surface of a housing; and
measuring a flow level of a second fluid comprising a liquid flowing in a fluid line with a sensor coupled to a housing.

18. The method of claim 17, further comprising increasing the velocity of the fluid flow of the first fluid by flowing the first fluid through a nozzle disposed in the housing.

19. The method of claim 17, further comprising regulating the pressure of the first fluid with a pressure regulator.

20. The method of claim 17, further comprising dispersing condensation disposed on the inner surface of the housing by directing the flow of the first fluid against the inner surface of the housing.

* * * * *